Nov. 27, 1956 J. C. JACOBSON 2,771,805
STUD LOOSENING AND TIGHTENING TOOL
Filed Sept. 8, 1955 2 Sheets-Sheet 1
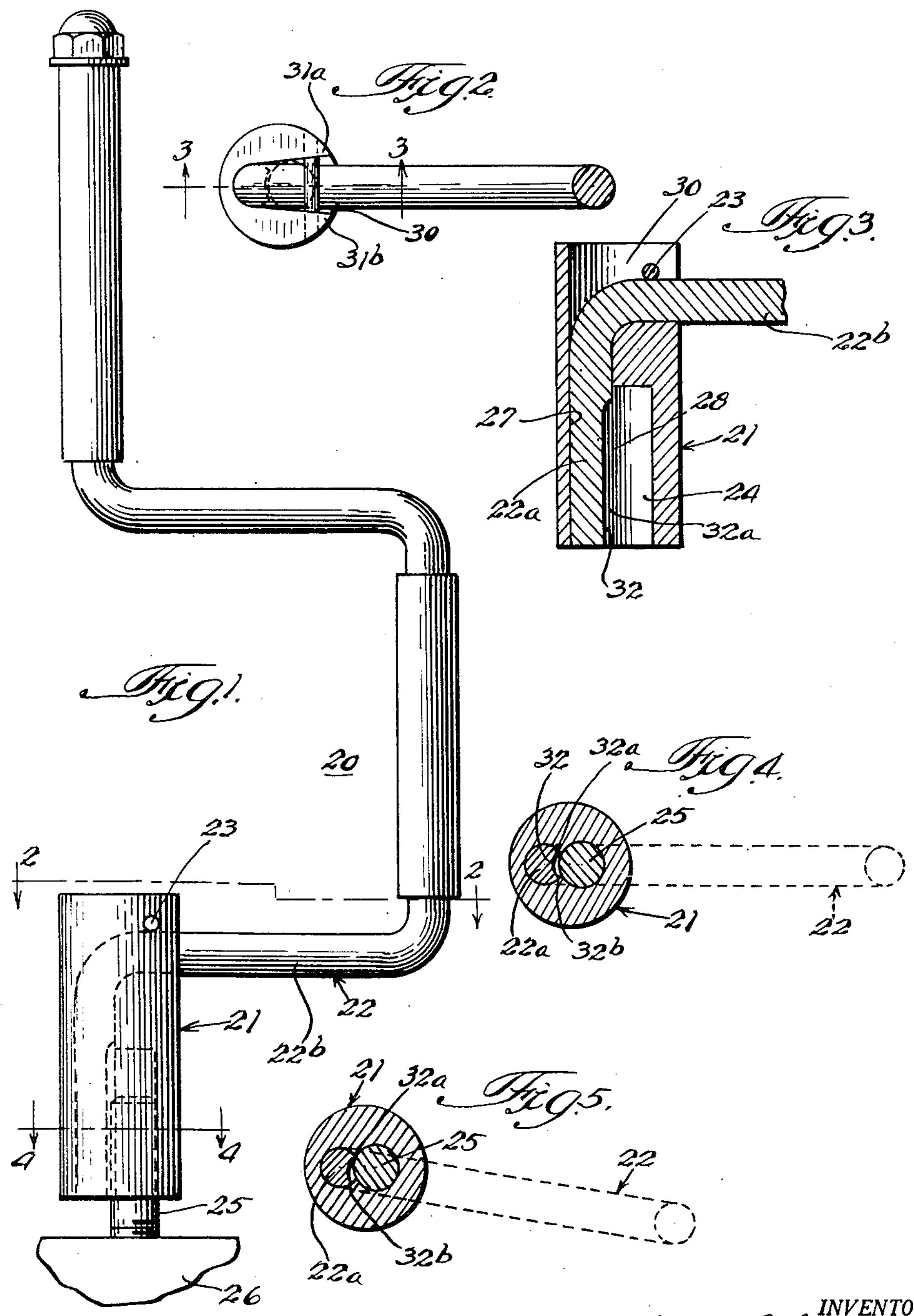
INVENTOR.
Jesse C. Jacobson
BY
Thiess, Olson, Mecklenburger, von Holst & Coltman. Attys Nov. 27, 1956 J. C. JACOBSON 2,771,805
STUD LOOSENING AND TIGHTENING TOOL
Filed Sept. 8, 1955 2 Sheets-Sheet 2
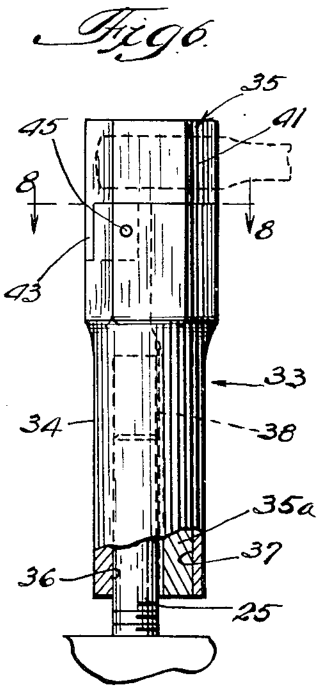
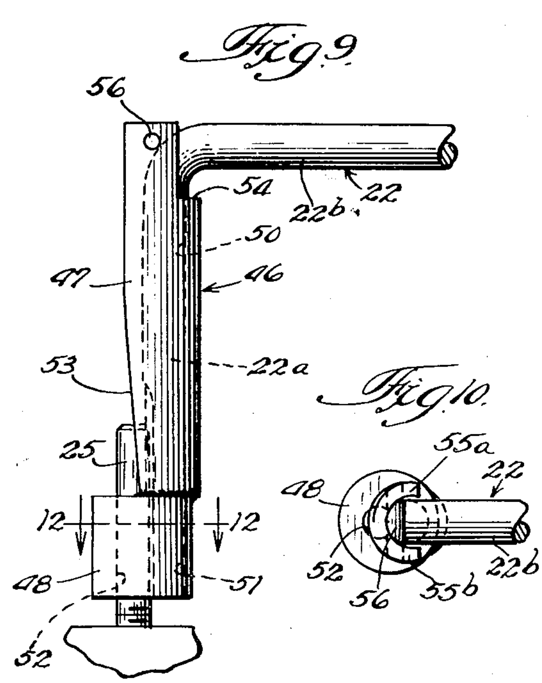
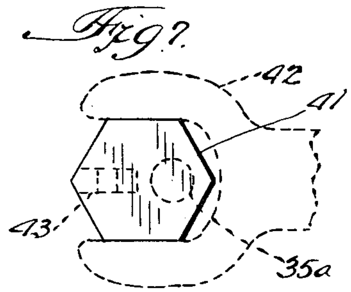
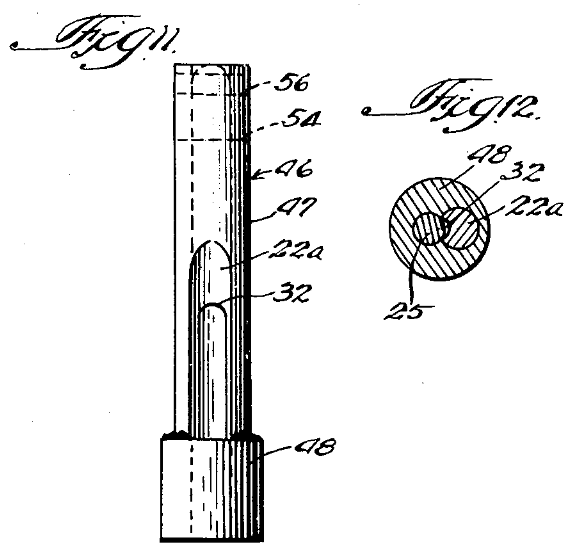
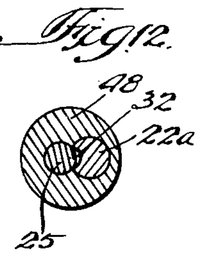
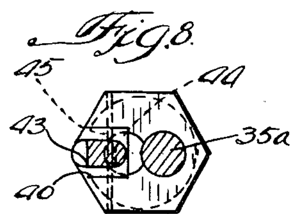
INVENTOR.
Jesse C. Jacobson.
BY.
Thiess, Olson, Mecklenburger, von Holst, + Coltman. Attys.

United States Patent Office 2,771,805

Patented Nov. 27, 1956

2,771,805

STUD LOOSENING AND TIGHTENING TOOL

Jesse C. Jacobson, Redwood City, Calif., assignor to United Air Lines, Inc., Chicago, Ill., a corporation of Delaware Application September 8, 1955, Serial No. 533,088

4 Claims. (Cl. 81—53)

This invention relates to a tool for facilitating the loosening or tightening of a stud, bolt or the like with respect to a workpiece.

Frequently, in the maintenance or repair of engines, machines, or the like, difficulty is encountered in loosening or tightening studs, bolts and the like because of their inaccessible location or their protruding peripheral surface not being adapted to accommodate a conventional type of wrench or other tool. Various tools have heretofore been proposed to solve this problem but have met with but limited success. This has been due in part to the tool either being of complex and costly design, failing to properly bite into the periphery of the stud, or not being capable of withstanding excessive torque, which is often required to be exerted, without breaking or damaging the tool.

Thus, it is an object of this invention to provide an improved tool which will overcome the shortcomings associated with the prior art tools.

It is a further object of this invention to provide a tool which is simple yet sturdy in construction, effective in operation, and inexpensive to produce.

Further and additional objects will appear from the description, accompanying drawings, and appended claims.

In accordance with one embodiment of this invention, a tool is provided comprising a housing for accommodating the protruding end of a stud, and a pawl removably mounted on said housing for applying torque to said stud upon turning of said pawl relative to said housing. The housing is provided with an elongated first cavity open at one end for receiving the protruding stud portion, and a second elongated cavity arranged in spaced substantially parallel relation with respect to the axis of the first cavity and having an end opening in substantially the opposite direction from the open end of the first cavity for receiving a portion of the pawl. Segments of the cavities are in overlapping communicating relation with respect to one another. The portion of the pawl disposed within the second cavity is grooved or splined to provide a pair of spaced substantially parallel elongated shoulders thereon. Only one of the shoulders protrudes into the first cavity and contacts the stud accommodated therein upon relative turning of said pawl in one direction. Mounted on the housing are stop means which are adapted to be engaged by the pawl and restricted turning of the latter to within a predetermined sector.

For a more complete understanding of this invention, reference should be made to the drawings wherein:

Figure 1 is a side elevational view of the improved tool in assembled relation and accommodating the protruding end of a stud;

Fig. 2 is a sectional view taken along line 2—2 of Fig. 1;

Fig. 3 is a fragmentary sectional view taken along line 3—3 of Fig. 2;

Fig. 4 is a fragmentary sectional view taken along line 4—4 of Fig. 1;

Fig. 5 is similar to Fig. 4 but showing the pawl in a changed position;

Fig. 6 is a side elevational view of a modified form of improved tool shown in assembled relation and accommodating the protruding end of a stud;

Fig. 7 is a top plan view of Fig. 6;

Fig. 8 is a sectional view taken along line 8—8 of Fig. 6;

Fig. 9 is a fragmentary side elevational view of a second modified form of improved tool;

Fig. 10 is a top plan view of Fig. 9;

Fig. 11 is a left side elevational view of Fig. 9; and

Fig. 12 is a sectional view taken along line 12—12 of Fig. 9.

Referring now to the drawings and more particularly to Figs. 1 through 5, an improved tool 20 is shown for tightening or loosening a stud 25 with respect to a workpiece 26. The tool 20, in this instance, comprises a housing 21, a removable pawl 22 mounted on the housing, and a removable pin 23 mounted on the housing for retaining the pawl and housing in assembled relation. The housing 21, as seen more clearly in Fig. 3, is provided with an elongated first cavity 24 which terminates within the housing and has one end thereof opening at the lower end of the housing for receiving the protruding portion of the stud 25. Also provided and formed within housing 21 is a second elongated cavity 27 which is disposed in spaced substantially parallel relation with respect to cavity 24. The spacing between the two cavities is such that segments 28 of the cavities overlap and are in communicating relation with respect to one another.

Formed at the upper end of housing 21 is a transversely extending passageway 30 which communicates with cavity 27 and is adapted to accommodate a portion 22*b* of the pawl 22. The size of the passageway 30 is considerably larger than the cross-sectional size of pawl portion 22*b* whereby the latter may pivot about pawl portion 22*a* as an axis through a sector of predetermined size. Spaced shoulders 31*a* and 31*b*, which are the side walls of passageway 30, define the limits of relative movement of the pawl 22 with respect to housing 21.

The upper end of housing 21 is provided with transversely disposed aligned openings for removably accommodating a pin 23, which is disposed above pawl portion 22*b* and, when in position, prevents disengagement of the housing with respect to pawl portion 22*a*. When the pawl and housing are in assembled relation, the portion 22*a* of the pawl, which is disposed within cavity 27, has the side thereof, adjacent cavity 24, provided with a longitudinally extending groove or spline 32. The radius of the groove, in this instance, is shown to be less than the radius of the cavity 24 in which the protruding end of the stud is accommodated, and by reason thereof, a pair of elongated sharp edged shoulders 32*a* and 32*b* are formed on pawl portion 22*a*. The shoulders are case hardened for prolonged wear. Upon relative turning of the pawl with respect to the housing, one of the shoulders 32*a* or 32*b* will bite into the protruding portion of the stud, accommodated in cavity 24, and permit turning force to be transmitted from the tool to the stud.

Which of the shoulders 32*a* or 32*b* will protrude into cavity 24 and contact the accommodated stud portion will depend upon the direction the pawl is turned relative to the housing. As seen in Fig. 5, upon turning the pawl 22 in a clockwise direction with respect to the housing 21, the elongated shoulder 32*a* formed in pawl portion 22*a* is adapted to contact and bite into the stud 25. The clearance provided in the passageway 30 for pawl portion 22*b* is such that one of the shoulders 32*a* or 32*b* is permitted to take a substantial bite into the accommodated portion of the stud 25 before pawl portion 22*b* engages one of the shoulders 31*a* or 31*b* formed in the upper end of housing 21. Once the pawl portion 22*b* engages housing shoulder 31*a* or 31*b*, the torque applied by the pawl to the stud 25 is transmitted through the housing 21 thereby avoiding excessive strain which might result on housing 21 if the stop shoulders 31*a* and 31*b* were not provided.

After the pawl has been turned relative to the housing the predetermined limited amount, the strain of the pawl pushing against the housing in an outward direction, which, if unlimited, could cause the housing to rupture, no longer increases with the application of additional force to the pawl. By reason of this fact the over-all size of the housing and accommodated pawl portion may be substantially smaller than would otherwise be required, thereby permitting the tool to be used in locations heretofore thought inaccessible for such a tool.

While pawl 22, in this instance, is shown to be in the shape of a brace, it is to be understood, of course, that the exposed portion of the pawl may be varied to any shape desired without departing from the scope of the invention, so as to facilitate accommodating a protruding stud portion.

In Figs. 6 through 8, a modified form of tool 33 is shown which includes a lower housing section 34 and an upper pawl section 35 which is removably mounted on the housing section 34. Housing section 34 is similar to housing 21, heretofore described, in that it is provided with a first elongated cavity 36, which is adapted to accommodate the protruding portion of the stud 25, and a second cavity 37 disposed in spaced parallel relation with respect to cavity 36 for accommodating a portion 35*a* of pawl section 35. Also as in the previously described construction segments of cavities 36 and 37 are disposed in overlapping communicating relation with respect to one another. The upper end of housing section 34 is provided with a transversely extending slot 40, the function of which will become apparent in the discussion to follow hereinafter.

The pawl section 35, in this instance, is provided with a hexagonally shaped head 41 which rests upon the upper edge of housing section 34. The peripheral shape of head section 41 may be varied as desired but should be provided with some type of facet so as to permit a wrench or pliers 42 to readily embrace the periphery of the head and effect relative turning of the pawl section 35 with respect to the housing section 34. Extending downwardly from the underside of head section 41 is an elongated case-hardened finger 35*a* which is adapted to be disposed within cavity 37 formed in housing section 34. The shape of finger 35*a* is substantially the same as that of pawl section 22*a*, heretofore described, in connection with tool 20. Spaced from finger 35*a* and extending downwardly from the underside of head section 41 is a flange or lug 43 which, when the pawl section 35 and housing section 34 are in assembled relation, is adapted to be disposed within the slot 40 formed in the upper end of housing section 34. The size of the slot 40 relative to the cross-sectional size of flange 43 is such that the flange is free to move within the slot through a predetermined sector upon relative turning of the pawl section 35 with respect to the housing section 34.

Flange 43 is provided with a bore 44 through which extends a retaining pin 45, the ends of which are removably supported by the opposing slot-forming portions of the housing section 34. Sufficient clearance is provided between the periphery of pin 45 and bore 44, formed in flange 43, to enable the flange 43 to move relative to the slot 40 without binding occurring between the pin 45 and the flange 43. The pin retains the pawl and housing sections in assembled relation with respect to one another.

A second modified form of housing 46 is shown in Figs. 9 through 12, which is adapted for use with a pawl 22 of the type heretofore described in connection with tool 20. The modified housing 46 is provided with upper and lower sections 47 and 48, respectively, which are secured to one another by welding or any suitable means. Upper section 47 is provided with an elongated center bore 50 which is adapted to accommodate pawl portion 22*a*. The bore 50 is disposed in axially aligned relation with a bore 51 formed in lower housing section 48. Disposed in spaced parallel relation with respect to bore 51 is a second bore 52 formed in lower housing section 48. The second bore or cavity 52 is adapted to accommodate the protruding stud portion 25. The spacing between bores 51 and 52 is such that portions of the peripheries thereof are in overlapping relation. Upper housing section 47 has a side 53 thereof scarfed or chamfered so as to permit the protruding portion of the stud 25 to extend above the lower housing section 48 when it is accommodated thereby without interference by section 47, and so as to facilitate dislodging from the tool a stud or the like that may tend to stick therein.

Formed in the upper end of housing section 47 is a cut-out portion 54 which, as shown in Fig. 10, forms a pair of spaced shoulders 55*a* and 55*b* which, when the pawl is turned relative to the housing about pawl portion 22*a* as an axis, are adapted to contact pawl portion 22*b* after relative movement of the pawl through a predetermined sector and function in the same manner as the shoulders 31*a* and 31*b* heretofore described in connection with tool 20. Removably mounted on the upper end portion of housing section 47 is a retaining pin 56 which retains the pawl and housing in assembled relation.

Thus, it will be seen that an improved tool for loosening or tightening a stud has been provided which is simple and inexpensive in construction and effective in operation. Furthermore, the tool permits the pawl to take a substantial bite into the protruding stud portion before the pawl is moved into contact with a stop formed on the housing. By reason of the housing limiting the relative movement of the pawl after the latter has taken a substantial bite into the exposed stud portion, the stresses created in the tool during use are effectively limited, with the result that a more compact and smaller size tool may be utilized without sacrificing the durability of the tool. The compactness of the improved tool permits utilization thereof in locations which were heretofore considered inaccessible for such a tool.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A stud loosening and tightening tool comprising a slender housing provided with an elongated first cavity open at one end to accommodate the protruding end of a stud and an elongated second cavity arranged in spaced substantially parallel relation therewith and having an end thereof opening in substantially the opposite direction from the open end of said first cavity, the spacing between said cavities being such that a segment of each of said cavities is in overlapping relation with respect to one another, an elongated pawl having a portion thereof removably mounted within said second cavity for turning relative thereto about the longitudinal axis of said second cavity, said pawl portion being longitudinally grooved to form a pair of spaced sharp edge shoulders, only one of which protrudes into the interior of said first cavity upon relative turning of said pawl in one direction, and a pair of relatively spaced stop means mounted in fixed relation on said housing adjacent the open end of said second cavity and accommodating a portion of said pawl therebetween, said stop means being separately engageable by said pawl portion to limit the relative turning movement of said pawl to within a predetermined sector.

2. A stud loosening and tightening tool comprising an elongated substantially thin wall cylindrically shaped housing provided with an elongated first cavity extending longtudinally of said housing and being open at one end to accommodate the protruding end of a stud and an elongated second cavity extending longitudinally of said housing and opening at the opposite end of said housing, said cavities having segments thereof in overlapping relation, a pawl removably mounted within said second housing cavity and having an elongated portion of said pawl, disposed adjacent the overlapped segment of said first cavity, longitudinally grooved to form a pair of spaced elongated shoulders only one of which protrudes into said first cavity upon relative turning of said pawl in one direction, a pair of relatively spaced stop means mounted on said housing adjacent the open end of said second cavity and accommodating a portion of said pawl therebetween, said stop means being separately engageable by said pawl portion to limit relative turning of said pawl to within a predetermined sector, and retaining means removably mounted on said pair of stop means and overlying said pawl portion to effect retention of said pawl in assembled relation within said second cavity.

3. A stud loosening and tightening tool comprising a substantially thin wall housing provided with an elongated first cavity open at one end to accommodate the protruding end of a stud and an elongated second cavity arranged in noncoaxial relation with said first cavity and opening in substantially the opposite direction from the open end of said first cavity, said cavities having segments thereof overlapping one another, the open end of said second cavity being provided with an angularly extending furrow communicating with said second cavity and having the sides of said furrow extending divergently outwardly from said second cavity, a pawl removably mounted within said second cavity for turning relative thereto about the axis of said second cavity and having a first portion of said pawl disposed within said furrow and movable therein to limit turning of said pawl through only a predetermined sector, and removable retaining means mounted on said housing and extending across said furrow and in overlying relation with said pawl first portion to effect retention of said pawl and housing in assembled relation; said pawl having a second elongated portion thereof, disposed adjacent the overlapping segments of the cavities grooved to provide a pair of elongated, spaced, substantially parallel shoulders, only one of said shoulders protruding into the interior of said first cavity upon relative turning of said pawl in one direction.

4. A stud loosening and tightening tool comprising a substantially thin wall housing provided with an elongated first cavity open at one end to accommodate the protruding end of a stud and an elongated second cavity arranged in noncoaxial relation with said first cavity and opening in substantially the opposite direction from the open end of said first cavity, said cavities having segments thereof overlapping one another, the end of said housing adjacent the open end of said second cavity being provided with a transversely extending furrow, and a pawl removably mounted on said housing; said pawl including an elongated longitudinally grooved first portion disposed within said second cavity for turning relative thereto about the axis of said second cavity whereupon only a predetermined part of said first portion protrudes into said first cavity upon relative turning of said first pawl portion in one direction, an exposed second portion integral with said first portion and overlying one end of said housing, said second portion having a faceted peripheral side surface, and a lug spaced from said first pawl portion and extending in substantially the same relative direction therefrom as said second pawl portion, said lug being disposed within said furrow for movement relative thereto to limit relative turning of said pawl through a predetermined sector.

References Cited in the file of this patent

UNITED STATES PATENTS

| | | |
|---|---|---|
| 715,631 | Ayers | Dec. 9, 1902 |
| 1,323,987 | Keller | Dec. 2, 1919 |
| 1,375,456 | Hasty | Apr. 19, 1921 |
| 1,526,900 | Byrne | Feb. 17, 1925 |
| 1,594,515 | Bruhn | Aug. 3, 1926 |
| 1,768,988 | Koziel | July 1, 1930 |